(12) United States Patent
Masumoto et al.

(10) Patent No.: US 10,027,169 B2
(45) Date of Patent: Jul. 17, 2018

(54) WIRELESS POWER SUPPLY SYSTEM, POWER TRANSMITTING APPARATUS AND POWER RECEIVING APPARATUS

(71) Applicant: Renesas Electronics Corporation, Tokyo (JP)

(72) Inventors: Gaku Masumoto, Tokyo (JP); Takefumi Endo, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 219 days.

(21) Appl. No.: 15/008,565

(22) Filed: Jan. 28, 2016

(65) Prior Publication Data
US 2016/0285311 A1    Sep. 29, 2016

(30) Foreign Application Priority Data
Mar. 23, 2015 (JP) ................................ 2015-059613

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC .... H02J 7/02; H02J 7/025; H02J 17/00; H02J 50/10; H02J 50/80; H01F 38/14
See application file for complete search history.

(56) References Cited

U.S. PATENT DOCUMENTS

| 9,001,881 B2 | 4/2015 | Okamura et al. | |
| 2012/0299389 A1* | 11/2012 | Lee | H04B 5/0031 307/104 |
| 2014/0009109 A1* | 1/2014 | Lee | H02J 17/00 320/108 |

FOREIGN PATENT DOCUMENTS

JP    2012-254003 A    12/2012

OTHER PUBLICATIONS

Wireless Power Consortium, "Qi the standard for wireless charging", [online] http://www.wirelesspowerconsortium.com/, saved Dec. 28, 2015.

* cited by examiner

*Primary Examiner* — Robert Deberadinis
(74) *Attorney, Agent, or Firm* — Sughrue Mion, PLLC

(57) ABSTRACT

Provided is a wireless power supply system including a power transmitting apparatus and a power receiving apparatus. The power transmitting apparatus includes a power transmitting coil that transmits AC power to the power receiving apparatus, a first modulation/demodulation unit that performs a modulation/demodulation process on the AC power of the power transmitting coil, a first transreceiver unit that transmits application data to the power receiving apparatus via the first modulation/demodulation unit. The power receiving apparatus includes a power receiving coil that receives the AC power from the power transmitting apparatus, a second modulation/demodulation unit that performs a modulation/demodulation process on the AC power of the power receiving coil, a second transreceiver unit that receives the application data from the power transmitting apparatus via the second modulation/demodulation unit, and an application processing unit that executes an application process based on the received application data.

15 Claims, 14 Drawing Sheets

WIRELESS POWER SUPPLY SYSTEM, POWER TRANSMITTING APPARATUS AND POWER RECEIVING APPARATUS

CROSS-REFERENCE TO RELATED APPLICATIONS

This application is based upon and claims the benefit of priority from Japanese patent application No. 2015-059613, filed on Mar. 23, 2015, the disclosure of which is incorporated herein in its entirety by reference.

BACKGROUND

The present invention relates to a wireless power supply system, a power transmitting apparatus, and a power receiving apparatus, and can be suitably used for, for example, a wireless power supply system, a power transmitting apparatus, and a power receiving apparatus that supplies power using a coil.

In recent years, wireless power supply (contactless power supply) for supplying power to electronic devices in a noncontact manner has been drawing attentions. Wireless Power Consortium (WPC) has developed Qi as a standard for wireless power supply (see Wireless Power Consortium, "Qi the standard for wireless charging" [online at http://www.wirelesspowerconsortium.com/]), and the development of a wireless power supply system in conformity to the Qi standard for supplying power or charging electric devices has been proceeding.

The wireless power supply system in conformity to the Qi standard supplies power from a power transmitting apparatus to a power receiving system by an electromagnetic induction system. In the electromagnetic induction system, an alternating current is applied to a power transmitting coil in a state where the power transmitting coil provided for the power transmitting apparatus is disposed proximate to a power receiving coil provided for the power receiving apparatus, and an electromotive force is generated in the power receiving coil of the power receiving apparatus so as to supply power.

As related art other than the one described above, Japanese Unexamined Patent Application Publication No. 2012-254003 is known.

SUMMARY

In the Qi standard, power is supplied from a power transmitting apparatus to a power receiving apparatus, and one-way communication from the power receiving apparatus to the power transmitting apparatus is possible. By communication from the power receiving apparatus to the power transmitting apparatus while the power transmitting apparatus supplies power, the power to be supplied is controlled.

However, related art such as the Qi standard takes into account only the one-way communication for transmitting a power receiving state and the like from the power receiving apparatus to the power transmitting apparatus in order for the power receiving apparatus side to control the power to be supplied from the power transmitting apparatus. Therefore, other communication cannot be performed between the power transmitting apparatus and the power receiving apparatus. Although it is expected that the wireless power supply will be used for various applications in the future, it is difficult to perform communication corresponding to each of the applications.

Accordingly, the present inventor has found a problem that in the related art, it is difficult to perform the communication corresponding to the application between the power transmitting apparatus and the power receiving apparatus.

Other problems of the related art and new features of the present invention will become apparent from the following descriptions of the specification and attached drawings.

According to an aspect of the invention, a wireless power supply system includes a power transmitting apparatus and a power receiving apparatus. The power transmitting apparatus includes a power transmitting coil, a first modulation/demodulation unit, and a first transreceiver unit. The power transmitting coil transmits AC power to the power receiving apparatus. The first modulation/demodulation unit performs a modulation/demodulation process on the AC power of the power transmitting coil. The first transreceiver unit performs two-way communication with the power receiving apparatus via the first modulation/demodulation unit and transmits application data to the power receiving apparatus.

Further, the power receiving apparatus includes a power receiving coil, a second modulation/demodulation unit, a second transreceiver unit, and an application processing unit. The power receiving coil receives the AC power from the power transmitting apparatus. The second modulation/demodulation unit performs a modulation/demodulation process on the AC power of the power receiving coil. The second transreceiver that performs two-way communication with the power transmitting apparatus via the second modulation/demodulation unit and receives the application data from the power transmitting apparatus. The application processing unit that executes an application process based on the received application data.

Note that implementations of the apparatus according to the above-mentioned aspect in the form of a system and a method, and a program for causing a computer to execute processing of the apparatus or a part of the processing of the apparatus, an imaging apparatus including the apparatus and the like may also be effective as aspects of the present invention.

According to the above aspect, it is possible to perform communication corresponding to an application between a power transmitting apparatus and a power receiving apparatus.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
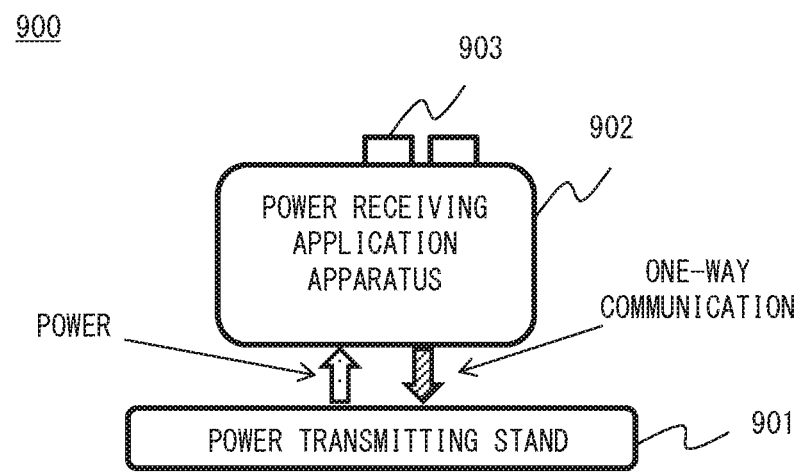
FIG. 1 is a conceptual drawing showing an overview of a wireless power supply system according to a reference example.

To clarify the explanation, some parts thereof and some of the drawings have been omitted or simplified as appropriate. Further, the elements illustrated in the drawings as functional blocks for performing various processes can be implemented hardware-wise by a CPU, a memory, and other circuits, and software-wise by a program loaded onto a memory or the like. Accordingly, it is to be understood by those skilled in the art that these functional blocks can be implemented in various forms including, but not limited to, being implemented by hardware alone, software alone, or a combination of hardware and software. Note that in the drawings, the same elements are denoted by the same reference numerals, and repeated descriptions are omitted as needed.

First Embodiment

Hereinafter, a first embodiment shall be explained with reference to the drawings.

Firstly, a reference example before this embodiment is applied shall be explained in order to compare this embodiment with the reference example. FIG. 1 shows an overview of a wireless power supply system according to the reference example. As shown in FIG. 1, a wireless power supply system 900 according to the reference example includes a power transmitting stand 901 and a power receiving application apparatus 902.

The wireless power supply system 900 according to the reference example wirelessly supplies power in conformity to the Qi standard. That is, when the power receiving application 902 is placed on the power transmitting stand 901, power is transmitted (power is supplied) from the power transmitting stand 901 to the power receiving application apparatus 902.

When an amount of power greater than an amount of power consumed by a load of a power receiving side is transmitted, heat caused by a difference power loss and a breakdown caused by an overvoltage could occur. It is thus necessary to control a transmitting power value so as to safely transmit power with high efficiency. For that reason, in the Qi standard, an increase/reduction of the transmitting power is requested in one-way communication from the power receiving side to the power transmitting side in order for the receiving side to have an optimal amount of power, and the power transmitting side controls the transmitting power value in accordance with the request.

Further, the power receiving application apparatus 902 according to the reference example includes a switch 903 that is necessary for a setting and an operation to achieve functions of an application. When the power receiving application apparatus 902 is, for example, a Bluetooth (registered trademark) device, a pairing switch which is the switch 903 for temporarily setting the device in a pairing mode will be necessary. When the switch 903 which is the pairing switch is pressed, and after the power receiving application apparatus is set for the pairing mode, the device is paired with another Bluetooth device to enable Bluetooth communication.

As described above, in the reference example, only one-way communication from the power receiving apparatus to the power transmitting apparatus is possible, and the power receiving apparatus requires several switches 903 in order to achieve the functions of the application.

On the other hand, as the wireless power supply enables easy power supply and charging without a cable, it has been desired to apply the wireless power supply to small devices such as a wearable device. Suppose that the power receiving application apparatus 902 according to the reference example is a wearable device including a rechargeable battery. As the wearable device does not need a connector which will be connected to a cable for charging because of the wireless power supply, the wearable device can be miniaturized.

However, as described above, the power receiving application apparatus 902 according to the reference example requires at least the physical (mechanical) switch 903 so as to achieve the functions of the application. As the wearable device is often worn by a user, the wearable device is required to have a waterproof property and corrosion resistance. However, including the switch 903 in the wearable device will cause problems that the waterproof property and corrosion resistance are deteriorated. In order to improve the waterproof property of the switch 903, there will be problems in regard to miniaturization and cost.

Figure 2:
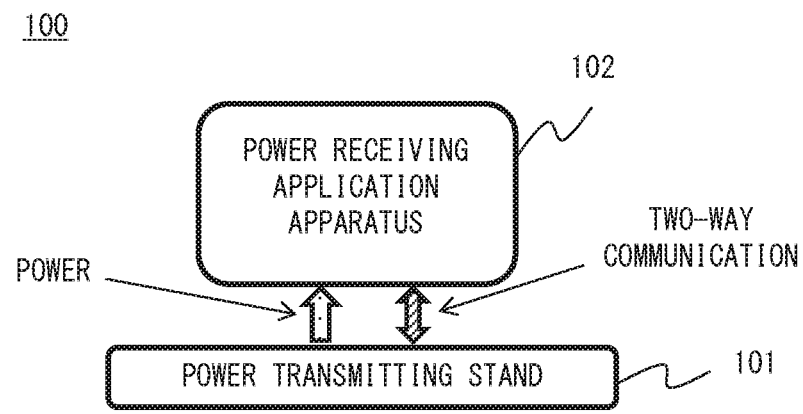
FIG. 2 is a conceptual drawing showing an overview of a wireless power supply system according to a first embodiment.

Thus, as shown in FIG. 2, this embodiment eliminates the need for a physical switch in the power receiving application apparatus. More specifically, as shown in FIG. 2, a wireless power supply system 100 according to this embodiment includes a power transmitting stand 101 and a power receiving application apparatus 102, and the power supply application apparatus 102 does not include a physical switch.

In this embodiment, power is transmitted (power is supplied) from the power transmitting stand 101 to the power receiving application apparatus 102, and two-way communication is performed between the power transmitting stand 101 and the power receiving application apparatus 102. This enables a setting, an operation and the like for achieving functions of an application to be performed in the communication from the power transmitting stand 101 to the power receiving application apparatus 102, thereby eliminating the need for the switch in the power receiving application apparatus 102.

As a request for setting the power receiving application apparatus 102 for the pairing mode can be transmitted from the power transmitting stand 101, the switch for the pairing mode can be omitted in the power receiving application apparatus 102. When the request for setting the power receiving application apparatus 102 for the pairing mode is transmitted from the power transmitting stand 101, and after the power receiving application apparatus is set for the pairing mode, the power receiving application apparatus 102 is paired with another Bluetooth device to enable Bluetooth communication.

As has been explained, in this embodiment, the two-way communication using a carrier of the wireless power supply enables operations and the like necessary for power transmission and reception. This eliminates the need for a connector that is necessary for charging and the need for a physical switch in the power receiving side, thereby easily enabling a waterproof property and corrosion resistance to be achieved.

Next, a configuration for enabling the above-described embodiment shall be explained as follows. An overview of the configuration of this embodiment shall be explained by referring to FIG. 3, and a specific example of a configuration of this embodiment shall be explained by referring to FIGS. 4 and 5.

Figure 3:
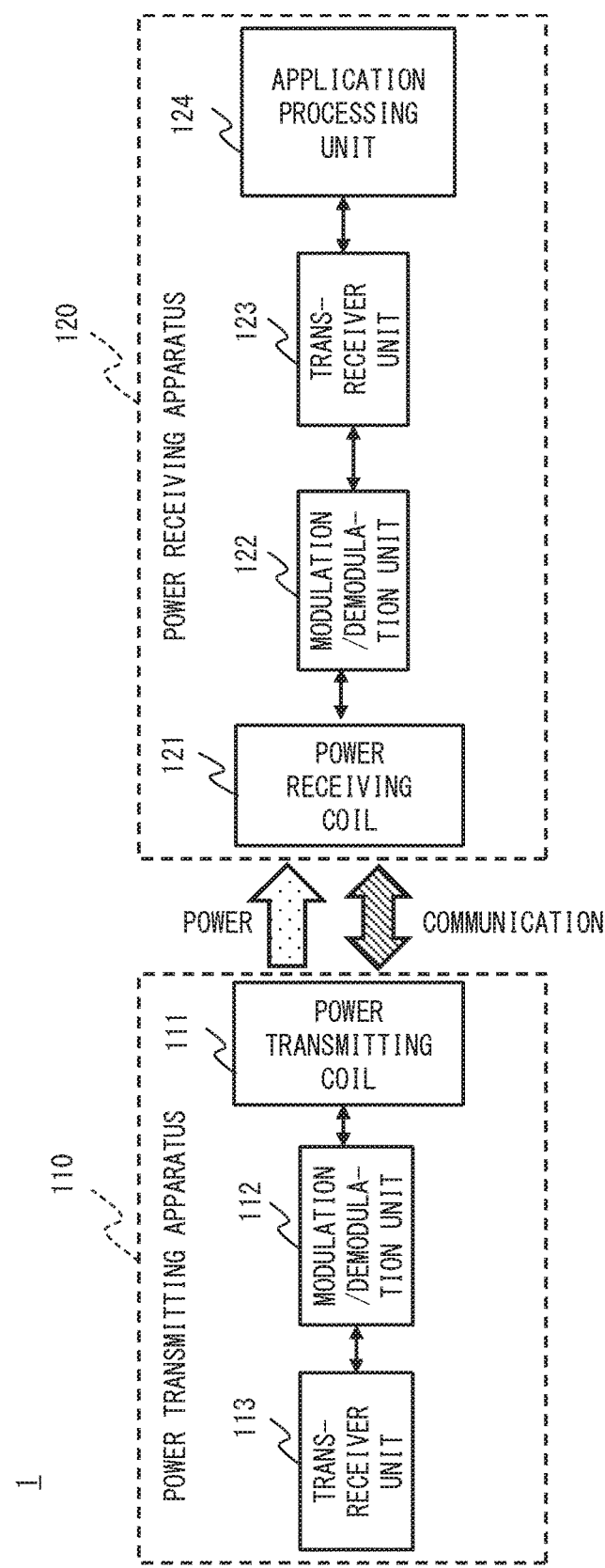
FIG. 3 is a block diagram showing a schematic configuration of the wireless power supply system according to the first embodiment.

FIG. 3 shows a main configuration example of a wireless power supply system according to this embodiment. As shown in FIG. 3, a wireless power supply system 1 includes a power transmitting apparatus 110 and a power receiving apparatus 120.

The power transmitting apparatus 110 includes a power transmitting coil 111, a modulation/demodulation unit 112, and a transreceiver unit 113. The power transmitting coil 111 transmits AC power to the power receiving apparatus 120. The modulation/demodulation unit (a first modulation/demodulation unit) 112 performs a modulation/demodulation process on the AC power of the power transmitting coil 111. The transreceiver unit (a first transreceiver unit) 113 performs two-way communication with the power receiving apparatus 120 via the modulation/demodulation unit 112 and transmits application data to the power receiving apparatus 120.

The power receiving apparatus 120 includes a power receiving coil 121, a modulation/demodulation unit 122, a transreceiver unit 123, and an application processing unit 124. The power receiving coil 121 receives the AC power from the power transmitting apparatus 110. The modulation/demodulation unit (a second modulation/demodulation unit) 122 performs a modulation/demodulation process on the AC power of the power receiving coil 121. The transreceiver unit (a second transreceiver unit) 123 performs two-way communication with the power transmitting apparatus 110 via the modulation/demodulation unit 122 and receives the application data from the power transmitting apparatus 110. The application processing unit 124 executes an application process based on the application data received by the transreceiver unit 123.

As described so far, in the wireless power supply system according to this embodiment, the power transmitting apparatus and the power receiving apparatus perform the modulation/demodulation process on the AC power (carrier) to be supplied so as to perform the two-way communication, and the application data is transmitted and received between the power transmitting apparatus and the power receiving apparatus. This enables wireless power supply between the power transmitting apparatus and the power receiving apparatus, and as the application data used in the execution of the application of the power receiving apparatus can be transmitted and received, communication corresponding to an application of the power receiving apparatus can be performed. In addition, as mentioned above, the switch for performing the setting and the like of the application can be omitted in the power receiving apparatus.

Figure 4:
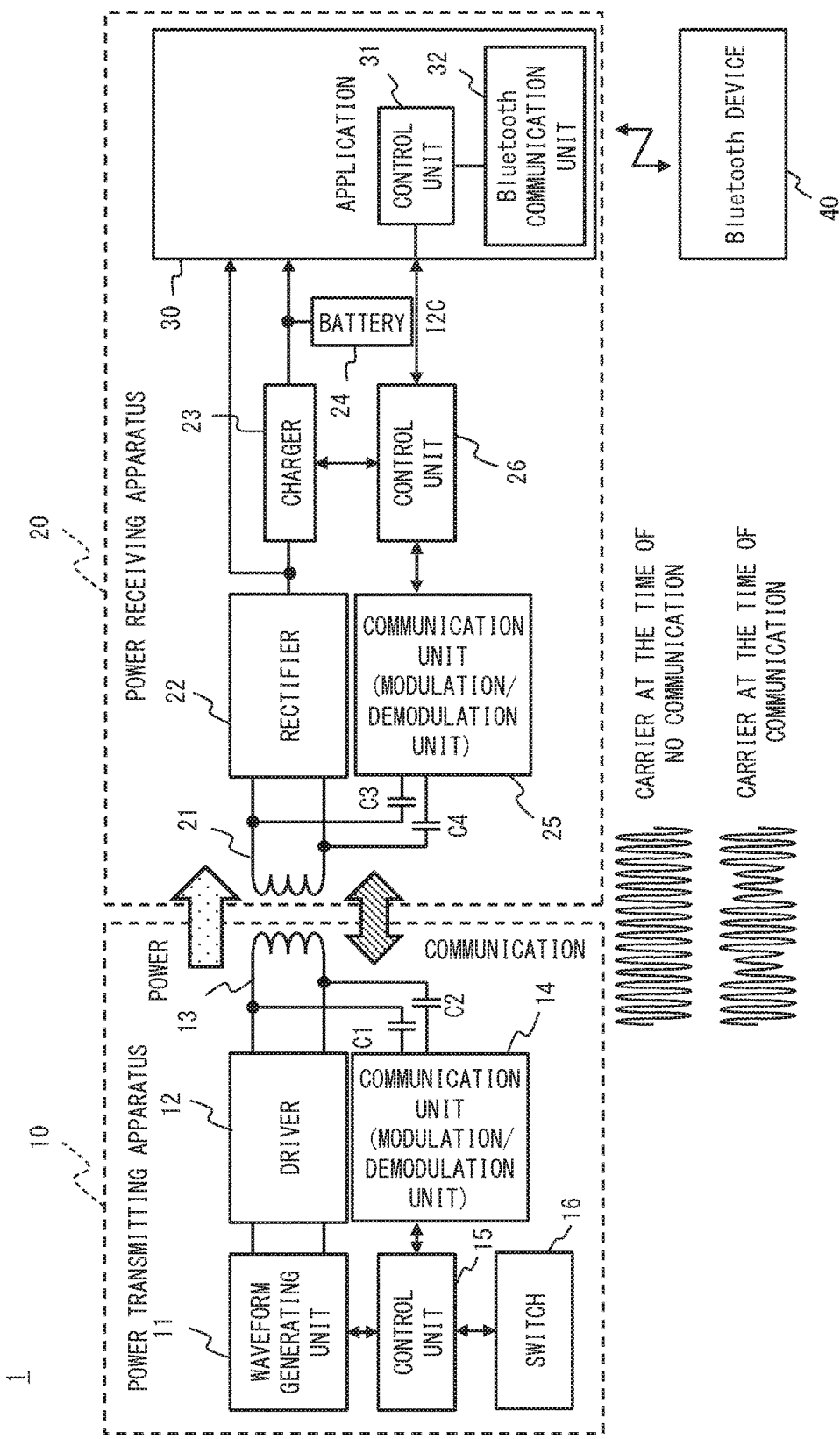
FIG. 4 is a block diagram showing a configuration example of the wireless power supply system according to the first embodiment.

FIG. 4 shows a specific configuration example of the wireless power supply system according to this embodiment. As shown in FIG. 4, the wireless power supply system 1 includes a power transmitting apparatus 10 and a power receiving apparatus 20. In the wireless power supply system 1, power is transmitted (power is supplied) from the power transmitting apparatus 10 to the power receiving apparatus 20 while two-way communication is performed between the power transmitting apparatus 10 and the power receiving apparatus 20 by the same carrier and the same coil antenna.

The power transmitting apparatus 10 includes a waveform generating unit 11, a driver 12, a coil antenna 13, a communication unit 14, a control unit 15, and a switch 16. The waveform generating unit 11 generates a pulse train by PWM (Pulse Width Modulation) according to control by the control unit 15. The driver 12 drives the coil antenna 13 and generates AC power according to a pulse width of the pulse train generated by the waveform generating unit 11. The coil antenna (a power transmitting coil: a primary coil) 13 transmits the AC power generated by driving the driver 12 to the coil antenna (a power receiving coil: a secondary coil) 21 of the power receiving apparatus 20. Although the coil antenna 13 and the coil antenna 21 have the same shape in this example, they may have arbitrary shapes.

The communication unit 14 performs a modulation/demodulation process on the AC power of the coil antenna 13. Although the communication unit 14 performs the modulation/demodulation process via, for example, the coil antenna 13 and capacitors C1 and C2, the communication unit 14 may perform the modulation/demodulation process via the waveform generating unit 11 or the driver 12. At the time of a transmission to the power receiving apparatus 20, the communication unit 14 amplitude modulates the AC power to superimpose transmission data from the control unit 15 on the AC power, while at the time of a reception from the power receiving apparatus 20, the communication unit 14 demodulates the AC power on which reception data has been superimposed by the amplitude modulation (load modulation) and outputs the demodulated reception data to the control unit 15. A method of modulation for the power transmission apparatus 10 to transmit power to the power receiving apparatus 20 is performed by changing a driver voltage according to the transmission data or changing a duty ratio of a carrier signal. Note that a modulation scheme to enable the two-way communication between the power transmission apparatus 10 and the power receiving apparatus 20 is not limited to the amplitude modulation (load modulation), and another modulation/demodulation scheme may be used as long as multiplexing on a carrier of supplying power is achieved.

The control unit 15 controls the pulse train generated by the waveform generating unit 11 and transmits data to or receives data from the power receiving apparatus 20 via the communication unit 14. The switch 16 is a physical switch that generates data for setting (initial setting) or operating the application of the power receiving apparatus 20. In this embodiment, the switch 16 is a pairing switch for setting the application of the power receiving apparatus 20 for the pairing mode. The control unit 15 generates the transmission data for requesting pairing when the switch 16 is turned ON and outputs the generated transmission data to the communication unit 14. Further, the control unit 15 controls the pulse train generated by the waveform generating unit 11 according to the reception data received via the communication unit 14 so as to control transmitting power.

The power receiving apparatus 20 includes a coil antenna 21, a rectifier 22, a charger 23, a battery 24, a communication unit 25, a control unit 26, and an application 30. The coil antenna 21 receives the AC power transmitted from the coil antenna 13 of the power transmitting apparatus 10. The rectifier 22 rectifies the AC power received by the coil antenna 21 and converts it into DC power. The DC power generated by the rectifier 22 is charged (stored) in the battery 24 which is a secondary battery via the charger 23 and then supplied to the application 30 and the like as a power source.

The communication unit 25 performs a modulation/demodulation process on the AC power of the coil antenna 21. Although the communication unit 25 performs the modulation/demodulation process via, for example, the coil antenna 21 and capacitors C3 and C4, the communication unit 25 may perform the modulation/demodulation process via the rectifier 22. At the time of a transmission to the power transmitting apparatus 10, the communication unit 25 amplitude modulates (load modulates) the AC power to superimpose transmission data from the control unit 26 on the AC power, while at the time of a reception from the power transmitting apparatus 10, the control unit 26 demodulates the AC power on which the reception data has been superimposed by the amplitude modulation and outputs the demodulated reception data to the control unit 26. More specifically, the communication unit 25 performs the modulation by a load modulation scheme in which a carrier signal amplitude is changed by changing an impedance of the coil antenna 21 according to the transmission data.

The control unit 26 transmits data to and receives data from the power transmitting apparatus 10 via the communication unit 25. The control unit 26 generates the transmission data according to a charged state of the charger 23 and outputs the generated transmission data to the communication unit 25. Further, the control unit 26 sets the application 30 according to the reception data received via the communication unit 25. The control unit 26 and the application 30 are connected by, for example, an I2C (Inter-Integrated Circuit) bus or the like, and the control unit 26 sets the application 30 via the I2C bus. In this embodiment, the control unit 26 sets the application 30 for the pairing mode according to the reception data requesting pairing.

The application 30 executes an application process which is a main function of the power receiving apparatus 20. Although the application 30 is included in, for example, the power receiving apparatus 20, the application 30 may be provided outside the power receiving apparatus 20. In this embodiment, the application 30 is an apparatus (a processing unit) for performing Bluetooth communication with a Bluetooth device 40 such as a smartphone. The application 30 includes a control unit 31 for controlling an operation of the application and a Bluetooth communication unit 32 for performing the Bluetooth communication. The control unit 31 sets the Bluetooth communication unit 32 for the pairing mode in response to the request for pairing transmitted from the control unit 26.

Figure 5:
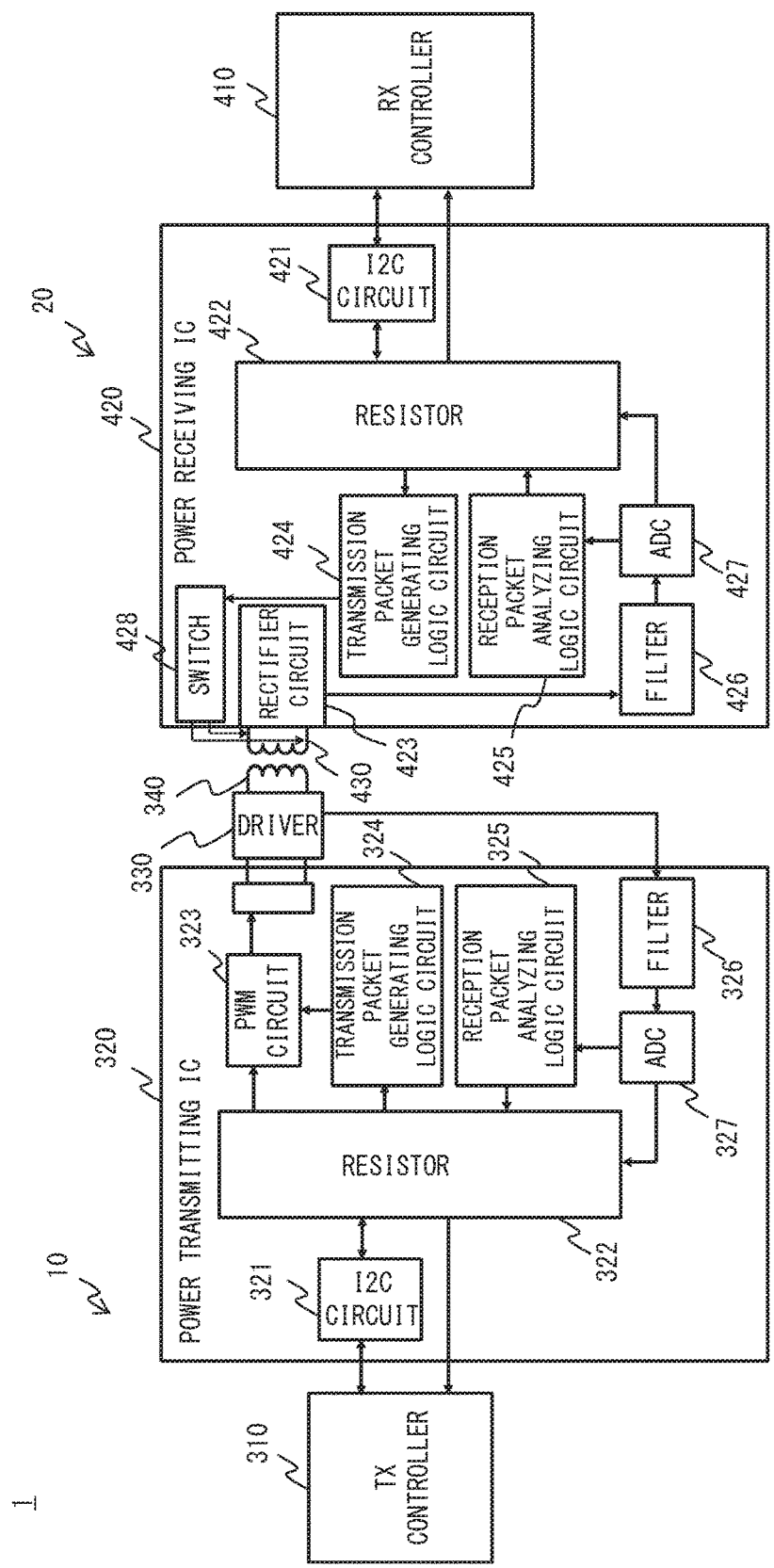
FIG. 5 is a block diagram showing a configuration example of the wireless power supply system according to the first embodiment.

FIG. 5 is a more specific configuration example of the wireless power supply system according to this embodiment and shows an example of achieving the wireless power supply system using a power transmitting IC and a power receiving IC. Note that as FIG. 5 mainly shows a configuration in which the two-way communication is performed between the power transmitting apparatus 10 and the power receiving apparatus 20, the charger, the battery, the application and the like shown in FIG. 4 are not shown.

In FIG. 5, a chipset of the power receiving IC and the power transmitting IC enables the two-way communication (WPT communication: Wireless Power Transmission communication) between transmission and reception by the amplitude modulation scheme using a wireless power transmission line. Communication from the power receiving side to the power transmission side is performed by the power receiving IC 420 changing a voltage amplitude of a power transmitting antenna by a load modulation and the power transmitting IC 320 detecting and demodulating the change. The communication from the power transmitting side to the power receiving side is performed by the power transmitting IC 320 modulating the transmitting power to thereby change a rectified output voltage of the power receiving IC 420 and detecting and demodulating the change.

The power transmitting apparatus 10 includes a TX controller 310, the power transmitting IC 320, a driver 330, and a coil antenna 340. As the TX controller 310 is similar to the control unit 15 of FIG. 4, the driver 330 is similar to the driver 12 of FIG. 4, and the coil antenna 340 is similar to the coil antenna 13 of FIG. 4, the power transmitting IC 320 shall be mainly explained hereinafter.

The power transmitting IC 320 is, for example, a one-chip semiconductor apparatus and corresponds to the waveform generating unit 11 and the communication unit 14 of FIG. 4. As shown in FIG. 5, the power transmitting IC 320 includes an I2C circuit 321, a register 322, a PWM circuit 323, a transmission packet generating logic circuit 324, a reception packet analyzing logic circuit 325, a filter 326, and an ADC (A/D converter) 327. By the configuration described above, the two-way communication can be concretely achieved by the power transmitting IC 320, which two-way communication could not have been possible to achieve by means of the Qi standard or the like.

The I2C circuit 321 is an interface circuit connected to the TX controller 310, and in this example, it is a circuit to be connected to the TX controller 310 via an I2C bus. Note that as long as a connection to the TX controller 310 can be obtained, it is not limited to the I2C, and the connection can be obtained by another interface.

The register 322 is a storage unit that stores data necessary for an operation of the power transmitting IC 320 and data and the like of a result of the operation. The register 322 stores, for example, PWM control data, a transmission trigger (a first transmission trigger flag), transmission data (first transmission data), a reception notification (a first reception notification flag), reception data (first reception data), a communication rate and the like. When the register 322 sets the transmission trigger and the reception notification in addition to the transmission data and the reception data, it is possible to control a transmission timing and a reception timing.

The PWM circuit (a pulse train generating unit) 323 generates a pulse train by PWM according to PWM control data that is stored in the register 322. The PWM control data is transmitted from the TX controller 310 and stored in the register 322 via the I2C circuit 321. Further, the PWM circuit 323 performs an amplitude modulation by changing a driving voltage according to a transmission packet generated by the transmission packet generating logic circuit 324. It can be said that the PWM circuit 323 and the transmission packet generating logic circuit 324 constitute a modulation unit (a first modulation unit) for performing the amplitude modulation according to the transmission data. Further, the PWM circuit 323 performs a modulation at a modulation rate corresponding to the communication rate that is stored in the register 322.

The transmission packet generating logic circuit (a first transmission packet generating unit) 324 generates a transmission packet of a predetermined format in such a way that the transmission packet includes the transmission data stored in the register 322 and outputs the generated transmission packet to the PWM circuit 323. The transmission data is transmitted from the TX controller 310 and stored in the register 322 via the I2C circuit 321.

The filter 326 filters a coil signal (carrier) obtained from the driver 330 or the coil antenna 340 and generates a signal having a predetermined frequency. The ADC (A/D converter) 327 AD converts the filtered coil signal and generates a digital signal. The filter 326 and the ADC 327 demodulate a signal that has been superimposed on the coil signal by the load modulation. It can be said that the filter 326 and the ADC 327 constitute a conversion unit (a first conversion unit) for converting an amplitude of the load modulated signal into a digital signal. Moreover, the filter 326 and the ADC 327 perform a demodulation at a demodulation rate corresponding to the communication rate stored in the register 322.

The reception packet analyzing logic circuit (a first reception packet analyzing unit) 325 analyzes a reception packet of a predetermined format based on the digital signal that has been AD converted by the ADC 327 and stores reception data included in the reception packet in the register 322. It can be said that, for example, the filter 326, the ADC 327, and the reception packet analyzing logic circuit 325 constitute a demodulation unit (a first demodulation unit) for demodulating the reception data based on the load modulated signal. The reception data stored in the register 322 is received by the TX controller 310 via the I2C circuit 321.

The power receiving apparatus 20 includes an RX controller 410, the power receiving IC 420, and a coil antenna 430. As the RX controller 410 is similar to the control unit 26 of FIG. 4, and the coil antenna 430 is similar to the coil antenna 21 of FIG. 4, the power receiving IC 420 shall be mainly explained hereinafter. Note that the RX controller 410 may include a Bluetooth function (the application 30) or a Bluetooth device (the application 30) may be connected to the RX controller 410.

The power receiving IC 420 is, for example, a one-chip semiconductor apparatus and corresponds to the rectifier 22 and the communication unit 25 of FIG. 4. As shown in FIG. 5, the power receiving IC 420 includes an I2C circuit 421, a register 422, a rectifier circuit 423, a transmission packet generating logic circuit 424, a reception packet analyzing logic circuit 425, a filter 426, an ADC 427, and a switch 428. By the configuration described above, the two-way communication can be concretely achieved by the power receiving IC 420, which two-way communication could not have been possible to achieve by means of the Qi standard or the like.

The I2C circuit 421 is an interface circuit connected to the RX controller 410, and in this example, it is a circuit to be connected to the RX controller 410 via an I2C bus. Note that as long as a connection to the RX controller 410 can be obtained, it is not limited to the I2C, and the connection can be obtained by another interface.

The register 422 is a storage unit that stores data necessary for an operation of the power transmitting IC 420 and data and the like of a result of the operation. The register 422 stores, for example, a transmission trigger (a second transmission trigger flag), transmission data (second transmission data), a reception notification (a second reception notification flag), reception data (second reception data), a communication rate, a charged state and the like. When the register 422 sets the transmission trigger and the reception notification in addition to the transmission data and the reception data, it is possible to control a transmission timing and a reception timing.

The transmission packet generating logic circuit (a second transmission packet generating unit) 424 generates a transmission packet of a predetermined format in such a way that the transmission packet includes the transmission data stored in the register 422 and outputs the generated transmission packet to the coil antenna 430 via the switch 428. The switch 428 is turned ON/OFF according to the transmission packet generated by the transmission packet generating logic circuit 424 and switches the impedance (a load) of the coil antenna 430 so as to perform a load modulation (an amplitude modulation). It can be said that the transmission packet generating logic circuit 424 and the switch 428 constitute a modulation unit (a second modulation unit) for performing the load modulation according to the transmission data. Further, the transmission data is transmitted from the RX controller 410 and stored in the register 422 via the I2C circuit 421.

The rectifier circuit 423 rectifies an AC signal of an electromotive force generated in the coil antenna 430 and generates a DC signal. The generated DC signal is supplied to the battery and application as a DC power source. Moreover, the signal rectified by the rectifier circuit 423 is supplied to the filter 426.

The filter 426 filters a coil signal (carrier) obtained from the rectifier circuit 423 or the coil antenna 440 and generates a signal having a predetermined frequency. The ADC 427 AD converts the filtered coil signal and generates a digital signal. The filter 426 and the ADC 427 demodulate a signal that has been superimposed on the coil signal by the amplitude modulation. It can be said that, for example, the filter 426 and the ADC 427 constitute a conversion unit (a second conversion unit) for converting an amplitude of the amplitude modulated signal into a digital signal. Moreover, the filter 426 and the ADC 427 perform a demodulation at a demodulation rate corresponding to the communication rate stored in the register 422.

The reception packet analyzing logic circuit (a second reception packet analyzing unit) 425 analyzes the reception packet of a predetermined format based on the digital signal that has been AD converted by the ADC 427 and stores reception data included in the reception packet in the register 422. It can be said that the filter 426, the ADC 427, and the reception packet analyzing logic circuit 425 constitute a demodulation unit (a second demodulation unit) for demodulating the reception data based on the amplitude modulated signal. The reception data stored in the register 422 is received by the RX controller 410 via the I2C circuit 421.

Next, an operation of this embodiment shall be explained as follows. Firstly, a two-way communication operation by the wireless power supply system according to this embodiment shall be explained as follows with reference to the configuration shown in FIG. 5.

Figure 6:
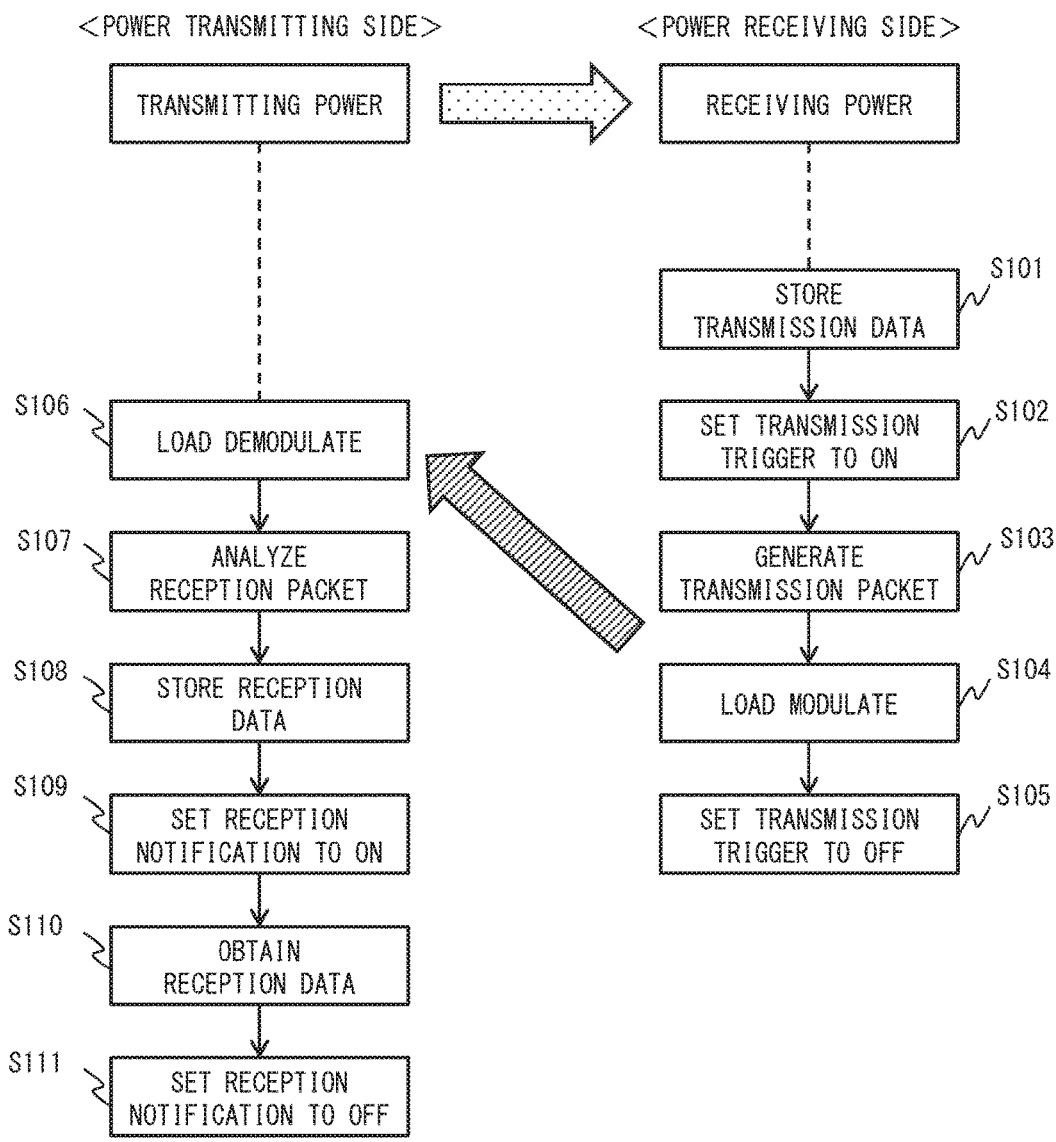
FIG. 6 is a flowchart showing a communication operation example of the wireless power supply system according to the first embodiment.

A flowchart of FIG. 6 shows an operation when data is transmitted from the power receiving apparatus 20 to the power transmitting apparatus 10. Firstly, the coil antenna 340 of the power transmitting IC 320 is disposed proximate to the coil antenna 430 of the power receiving IC 420, and power transmission from the power transmitting IC 320 to the power receiving IC 420 is started. In this state, data is transmitted from the power receiving IC 420 to the power transmitting IC 320 by processes from S101 onward.

In the power receiving apparatus 20 side, the RX controller 410 stores the transmission data in the register 422 (S101), and when the storage is completed, the transmission trigger of the register 422 is set to ON (=1) (S102). When the transmission trigger of the register 422 becomes ON, the transmission packet generating logic circuit 424 generates the transmission packet based on the transmission data stored in the register 422 in order to start transmitting the transmission data (S103).

Figure 7:
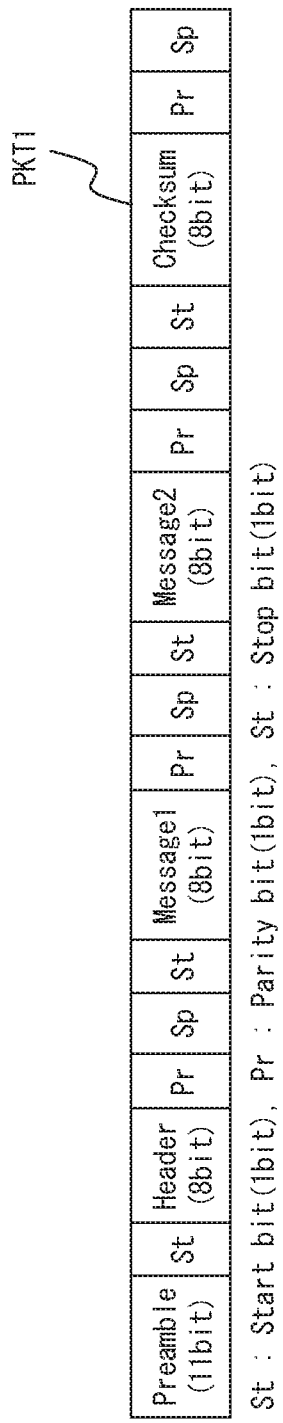
FIG. 7 is a drawing showing a format of a packet used in the wireless power supply system according to the first embodiment.

FIG. 7 shows an example of a format of a data packet which will be transmitted and received in the two-way communication between the power transmitting IC 320 and the power receiving IC 420. As shown in FIG. 7, a data packet PKT1 includes a Preamble, a Header, a Message1, a Message2, and a Checksum. The data packet PKT1 is a fixed length packet, and a length of the Preamble is, for example, eleven bits, and lengths of the Header, the Message1, the Message2, and the Checksum are, for example, eight bits. An odd parity bit (Pr) which is one bit is added to each of the Header, the Message1, and the Message2, and the Checksum generated by EOR (exclusive or) is added to the end of the packet. Further, a Start bit (St) which is one bit is added to the beginning of the Header, the Message1, and the Message2 each, and a Stop bit (St) which is one bit is added to the end of the Header, the Message1, and the Message2 each.

In S101, the RX controller 410 stores the Header, the Message1, and the Message2 of the transmission packet in the register 422. In S103, the transmission packet generating logic circuit 424 adds a Parity bit to each of the Header, the Message1, and the Message2 that are stored in the register 422, adds the calculated Checksum, and generates the transmission packet having the format of the data packet PKT1 shown in FIG. 7.

Next, the transmission packet generating logic circuit 424 transmits the generated packet to the power transmitting IC 320 by the load modulation (S104). More specifically, the transmission packet generating logic circuit 424 turns ON/OFF the switch 428 (e.g. an open drain NMOS switch) that is connected to the coil antenna 430 according to the transmission packet, and switches an impedance of the coil antenna 430 to thereby change (load modulates) a capacitance value and modulate a voltage amplitude of the coil antenna 340 in the power transmission side.

Figure 8:
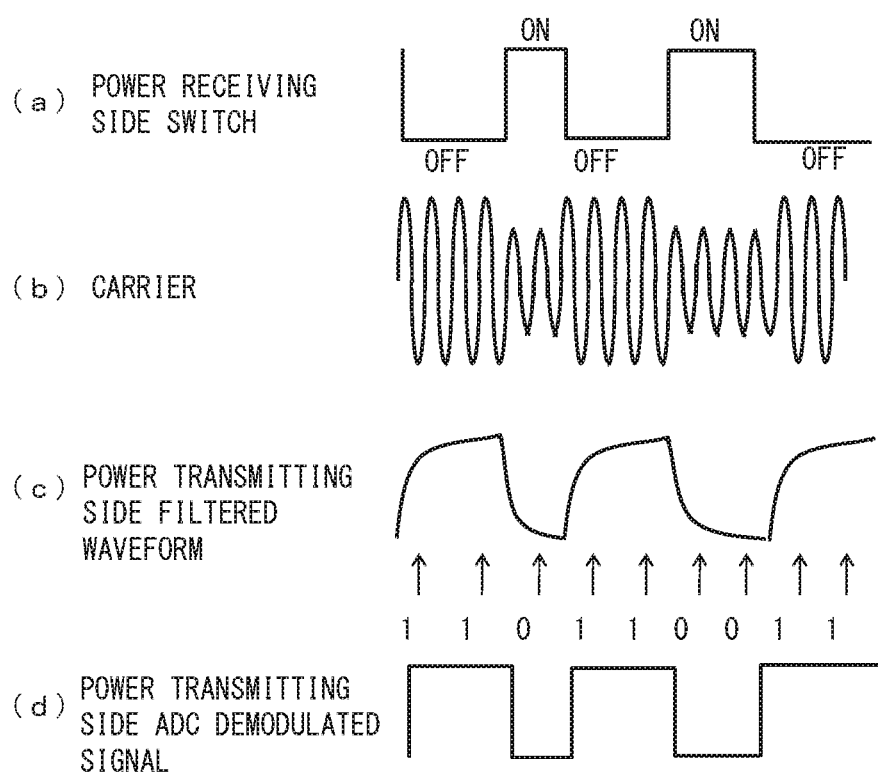
FIG. 8 is a waveform diagram showing a signal of the wireless power supply system according to the first embodiment.

As shown in, for example, FIG. 8(*a*), the transmission packet generating logic circuit 424 generates a switch control signal which becomes high/low according to bits of the transmission packet and turns ON/OFF the switch 428 of the coil antenna 430. Then, as shown in FIG. 8(*b*), as a load of the coil antenna 340 in the power transmission side is switched according to ON/OFF of the switch 428, thereby switching the amplitude of the carrier (the AC signal) used to transmit power.

Next, when the transmission of the transmission packet is completed, the transmission packet generating logic circuit 424 sets the transmission trigger of the register 422 to OFF (=0) (S105). When the transmission trigger of the register 422 is set to OFF, the RX controller 410 can detect the completion of the data transmission, and then the next data is transmitted in a manner similar to the processes from S101 onward as necessary.

In the power transmitting apparatus 10 side, the filter 326 and the ADC 327 in the power transmitting IC 320 demodulate the load modulated (amplitude modulated) signal (S106). As shown in, for example, FIG. 8(*c*), the filter 326 filters the carrier (the AC signal) obtained from the coil antenna 340 and generates a filtered waveform corresponding to the amplitude of the carrier. Moreover, as shown in FIG. 8(*d*), the ADC 327 AD converts the filtered waveform and generates a demodulated signal.

Next, the transmission packet analyzing logic circuit 325 analyzes a reception packet based on the demodulated signal (S107) and stores reception data included in the reception packet in the register 322 (S108). The reception packet analyzing logic circuit 325 analyzes the demodulated signal according to the format of the data packet PKT1 shown in FIG. 7. At this time, an error detection is performed based on the Parity bit and the Checksum of the reception packet, which is the demodulated signal, and the Header, the Message1, and the Message2 are obtained from the reception packet and stored in the register 322.

Next, when the analysis and storage of the reception data is completed, the reception packet analyzing logic circuit 325 sets the reception notification of the register 322 to ON (=1) (S109). When the reception notification of the register 322 becomes ON, the TX controller 310 detects the reception of the data and obtains the reception data stored in the register 322 (S110). More specifically, the TX controller 310 obtains the Header, the Message1, and the Message2 from the register 322.

When the TX controller has completed obtaining the reception data from the register 322, the TX controller 310 sets the reception notification of the register 322 to OFF (=0) (S111). When the reception notification of the register 322 becomes OFF, the reception packet analyzing logic circuit 325 can write the next reception data in the register 322.

Figure 9:
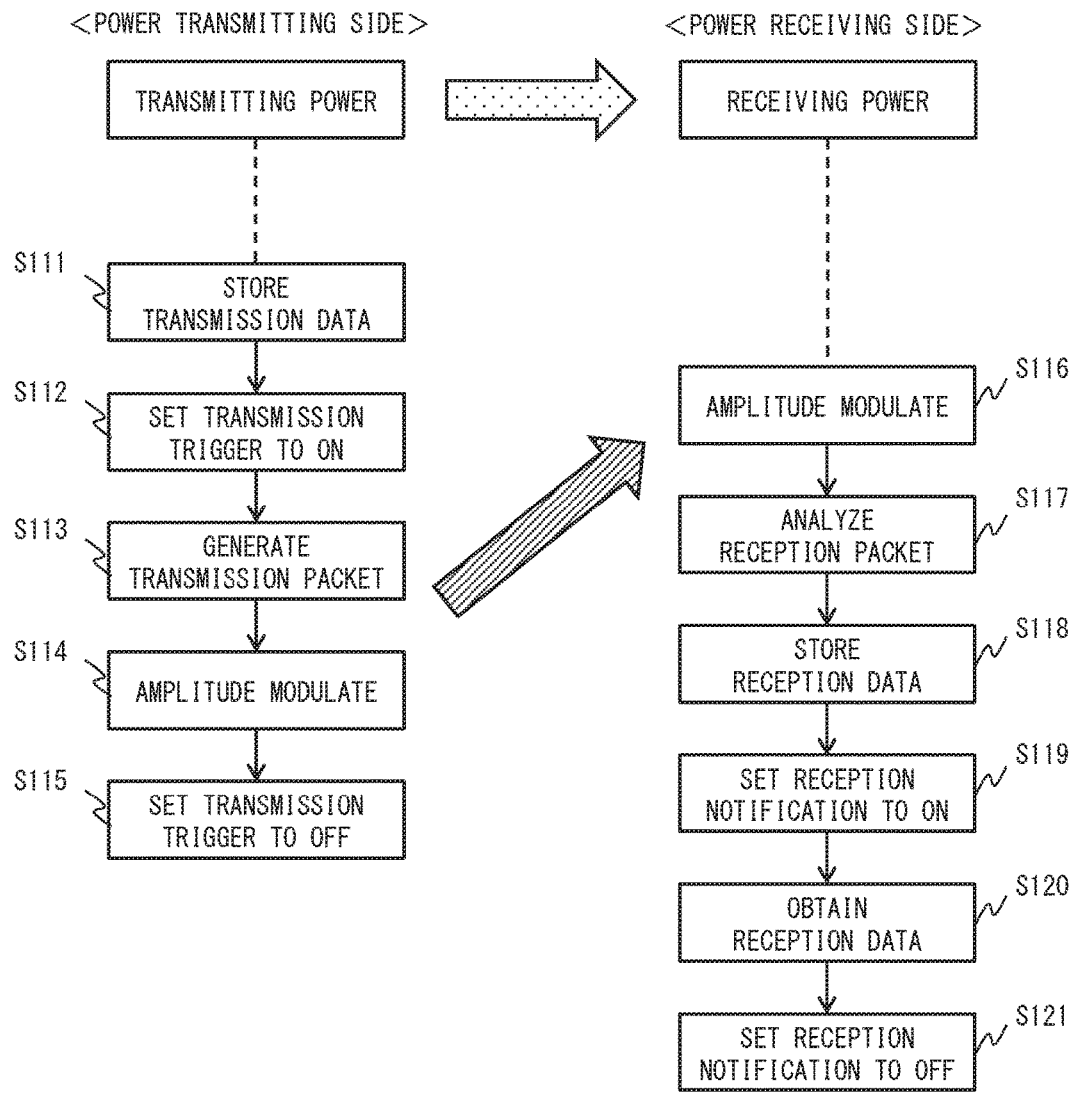
FIG. 9 is a flowchart showing a communication operation example of the wireless power supply system according to the first embodiment.

A flowchart in FIG. 9 shows an operation when data is transmitted from the power transmitting apparatus 10 to the power receiving apparatus 20. Firstly, the coil antenna 340 of the power transmitting IC 320 is disposed proximate to the coil antenna 430 of the power receiving IC 420, and power transmission from the power transmitting IC 320 to the power receiving IC 420 is started. In this state, data is transmitted from the power transmitting IC 320 to the power receiving IC 420 by processes from S111 onward.

In the power transmitting apparatus 10 side, the TX controller 310 stores the transmission data in the register 322 (S111), and when the storage is completed, the transmission trigger of the register 322 is set to ON (=1) (S112). When the transmission trigger of the register 322 becomes ON, the transmission packet generating logic circuit 324 generates the transmission packet based on the transmission data stored in the register 322 in order to start transmitting the transmission data (S113).

In a manner similar to the processes in FIG. 6, the TX controller 310 stores a Header, a Message1, and a Message2 in the register 322, and the transmission packet generating logic circuit 324 generates the transmission packet having the format of the data packet PKT1 shown in FIG. 7 with the Header, the Message1, and the Message2 that are stored in the register 422.

The transmission packet generating logic circuit 324 and the PWM circuit 323 transmit the generated packet to the power receiving IC 420 by the amplitude modulation (S114). That is, the transmission packet generating logic circuit 324 outputs the transmission packet to the PWM circuit 323, and the PWM circuit 323 modulates a voltage amplitude of the coil antenna 340 according to the transmission packet.

Figure 10:
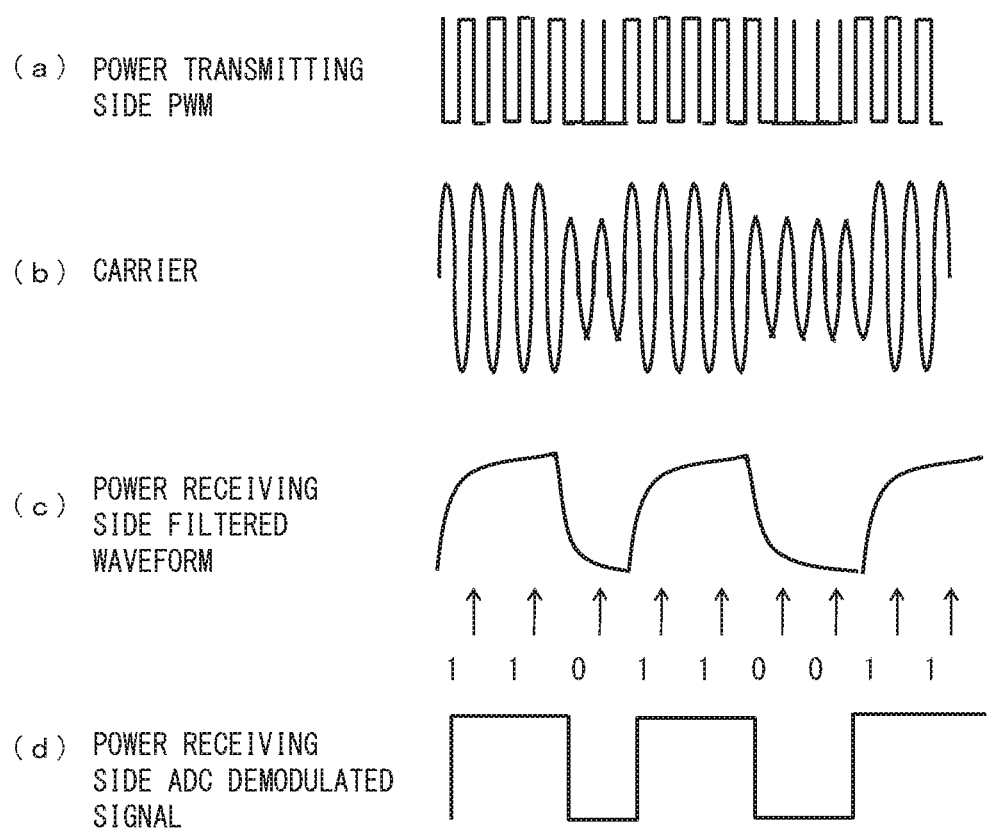
FIG. 10 is a waveform diagram showing a signal of the wireless power supply system according to the first embodiment.

As shown in, for example, FIG. 10(*a*), the PWM circuit 323 generates a pulse train having a pulse width corresponding to bits of the transmission packet and outputs the generated pulse train to the driver 330. Then, as shown in FIG. 10(b), as an output voltage from the driver 330 to the coil antenna 340 is switched according to the pulse width of the pulse train, the amplitude of the carrier (the AC signal) used to transmit power is switched.

Next, when the transmission of the transmission packet is completed, the transmission packet generating logic circuit 324 sets the transmission trigger of the register 322 to OFF (=0) (S115). When the transmission trigger of the register 322 is set to OFF, the TX controller 310 can detect the completion of the data transmission, and then the next data is transmitted in a manner similar to the processes from S111 onward as necessary.

In the power receiving apparatus 20 side, in the power receiving IC 420, the filter 426 and the ADC 427 demodulate the amplitude modulated signal (S116). As shown in, for example, FIG. 10(c), the filter 426 filters the carrier (a rectified output voltage) obtained from the coil antenna 340 or the rectifier circuit 423 and generates a filtered waveform corresponding to the amplitude of the carrier. Further, as shown in FIG. 10(d), the ADC 427 AD converts the filtered waveform and generates a demodulated signal.

Next, the reception packet analyzing logic circuit 425 analyzes the transmission packet based on the demodulated signal (S117) and stores the reception data included in the reception packet in the register 422 (S118). In a manner similar to the processes in FIG. 6, the reception packet analyzing logic circuit 425 analyzes the demodulated signal according to the format of the data packet PKT1 shown in FIG. 7, obtains the Header, the Message1, and the Message2 from the reception packet and stores them in the register 422.

After this, when the analysis and storage of the reception data is completed, the reception packet analyzing logic circuit 425 sets the reception notification of the register 422 to ON (=1) (S119). When the reception notification of the register 422 becomes ON, the RX controller 410 detects the reception of the data and obtains the reception data stored in the register 422 (S120). More specifically, the RX controller 410 obtains the Header, the Message1, and the Message2 from the register 422.

Next, when the RX controller 410 has completed obtaining the reception data from the register 422, the RX controller 410 sets the reception notification of the register 422 to OFF (=0) (S111). When the reception notification of the register 422 becomes OFF, the reception packet analyzing logic circuit 425 can write the next data in the register 422.

Hereinafter, a specific example of a pairing operation by the wireless power supply system according to this embodiment shall be explained. As there are three schemes of Bluetooth pairing, namely, legacy pairing, secure simple pairing, and smart pairing, operation examples of the three schemes shall be explained below.

Figure 11:
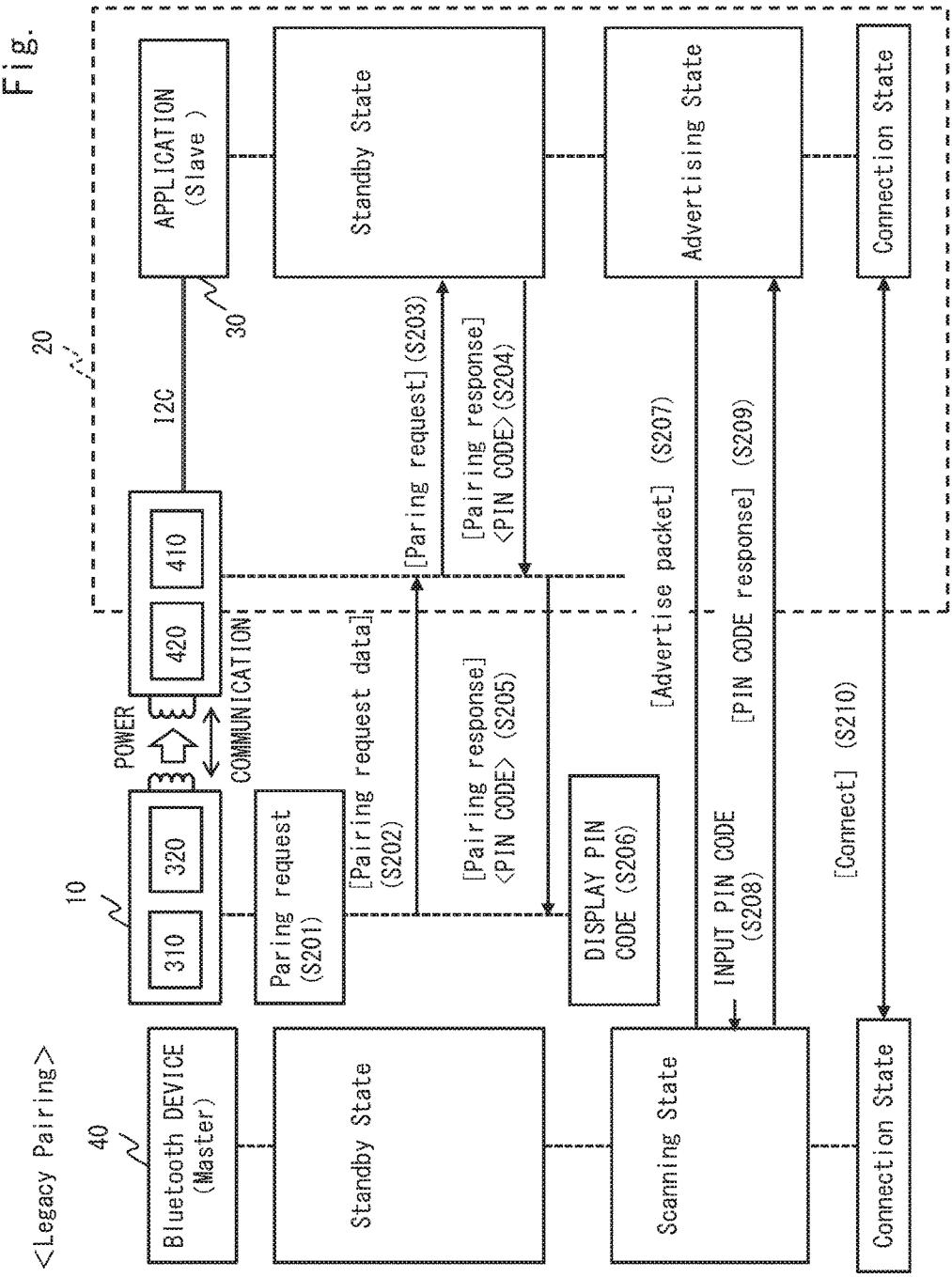
FIG. 11 is a sequence diagram showing a pairing operation example of the wireless power supply system according to the first embodiment.

FIG. 11 shows an operation example when pairing is established by Legacy Pairing. Legacy Pairing is a pairing scheme employed by Bluetooth V2.0 and before. In Legacy Pairing, as a four-digit PIN code will be necessary, the PIN code is transmitted in the two-way communication of this embodiment.

As shown in FIG. 5, the power transmitting apparatus 10 includes the TX controller 310 and the power transmitting IC 320, and the power receiving apparatus 20 includes the RX controller 410 and the power receiving IC 420. Further, the Bluetooth device 40 is a master device of Bluetooth, and the application 30 of the power receiving apparatus 20 is a slave device of Bluetooth. Firstly, the Bluetooth device 40 and the application 30 are in a Standby State before pairing is established. Moreover, power is being transmitted from the power transmitting apparatus 10 to the power receiving apparatus 20, and the two-way communication is possible as described above.

In the example of FIG. 11, to establish pairing, a user requests pairing to the power transmitting apparatus 10 (S201). The pairing is requested when the user, for example, presses the switch 16 of the power transmitting apparatus 10.

Next, when the TX controller 310 accepts the request for pairing, the power transmitting IC 320 transmits Pairing request data to the power receiving apparatus 20 (S202). As described above, the power transmitting IC 320 generates a packet including the Pairing request data, superimposes the generated packet on the transmitting power, and transmits the packet to the power receiving apparatus 20. The Pairing request data is pairing request (setting) data for setting the application 30 for the pairing mode (an advertising mode).

Next, in the power receiving apparatus 20, when the power receiving IC 420 analyzes the received packet and receives the Pairing request data, the RX controller 410 outputs a Pairing request to the application 30 (S203). After this, when the application 30 receives the Pairing request, the application 30 outputs a Pairing response including the PIN code to the RX controller 410 in order to establish Legacy Pairing (S204). Note that the PIN code is set in the application 30 in advance.

Next, when the RX controller 410 accepts the Pairing response, the Pairing response including the PIN code is transmitted from the power receiving IC 420 to the power transmitting apparatus 10 (S205). As described above, the power receiving IC 420 generates the packet including the Pairing response, superimposes the generated packet on the transmitting power, and transmits the packet to the power transmitting apparatus 10.

Next, in the power receiving apparatus 10, the power transmitting IC 320 analyzes the received packet and receives the Pairing response, the PIN code included in the Pairing response is output from the TX controller 310 to the user (S206). The power transmitting apparatus 10 includes, for example, a display unit, and displays the PIN code on the display unit.

On the other hand, as the application 30 has accepted the Pairing request, the application 30 transitions from the Standby state to an Advertising State. In the Advertising State, the application 30 reports Advertise packets to the surroundings by the Bluetooth communication unit 32 (S207).

The Bluetooth device 40 transitions from the Standby State to a Scanning State in order to establish pairing. The Bluetooth device 40 in the Scanning State receives the Advertise packet transmitted by the application 30 and waits for an input of the PIN code. When the user inputs the PIN code displayed on the power transmitting apparatus 10 in the Bluetooth device 40 (S208), the Bluetooth device 40 transmits a PIN CODE response including the input PIN code to the application 30 (S209).

Then, Legacy Pairing is completed. Thus, the Bluetooth device 40 and the application 30 are connected (S210), and the Bluetooth device 40 and the application 30 will be in a state of connection that allows Bluetooth communication.

Figure 12:
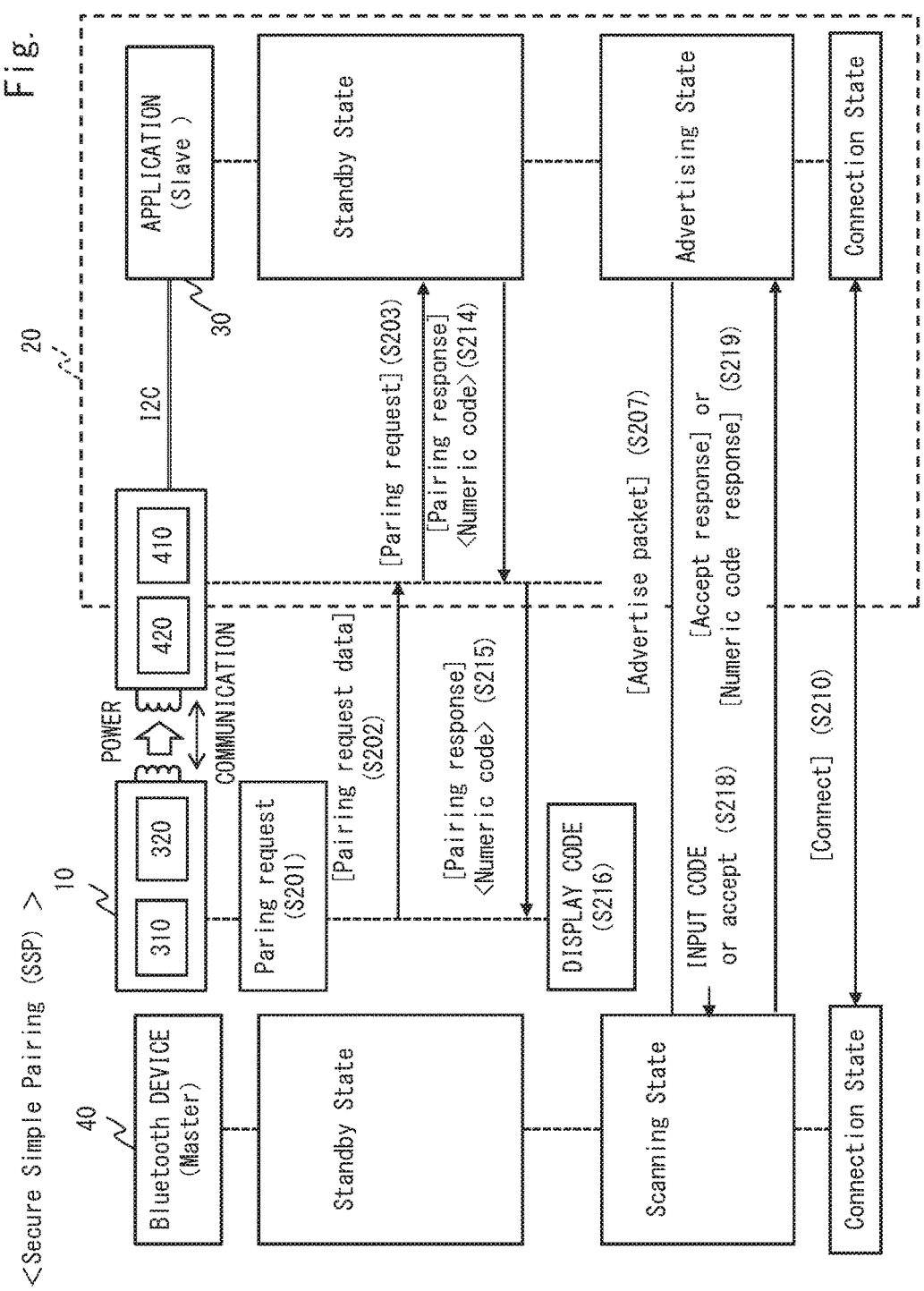
FIG. 12 is a sequence diagram showing a pairing operation example of the wireless power supply system according to the first embodiment.

FIG. 12 shows an operation example when pairing is established by Secure Simple Pairing (SSP). Secure Simple Pairing is a pairing scheme employed by Bluetooth V2.1. In Secure Simple Pairing, a six-digit Numeric code will be necessary, and the Numeric code is transmitted in the two-way communication according to this embodiment.

In the example of FIG. 12, in a manner similar to the operations in FIG. 11, when a user requests the power transmitting apparatus 10 to establish pairing (S201), Pairing request data is transmitted from the power transmitting IC 320 to the power receiving apparatus 20 (S202), and the power receiving IC 420 and the RX controller 410 output a Pairing request to the application 30 (S203).

Next, when the application 30 accepts the Pairing request, the application 30 outputs a Pairing response including the Numeric code to the RX controller 410 in order to establish secure simple pairing (S214). Note that the Numeric code is previously set in the application 30. After this, when the RX controller 410 accepts the Pairing response, the Pairing response including the Numeric code is transmitted from the power receiving IC 420 to the power transmitting apparatus 10 (S215).

Next, in the power transmitting apparatus 10, when the power transmitting IC 320 analyzes the received packet and receives the Pairing response, the TX controller 310 outputs the Numeric code included in the Pairing response to the user (S216). The power transmitting apparatus 10 includes, for example, a display unit and displays the Numeric code on the display unit.

On the other hand, the application 30 transitions from the Standby State to the Advertising State, and the Bluetooth communication unit 32 reports Advertise packet to the surroundings (S207). The Bluetooth device 40 transitions from the Standby State to the Scanning State, receives the Advertise packet transmitted by the application 30, and waits for an input of the Numeric code.

When the user inputs the Numeric code displayed on the power transmitting apparatus 10 in the Bluetooth device 40 (or the user accepts the pairing) (S218), the Bluetooth device 40 transmits a Numeric code response including the input Numeric code or an Accept response to the application 30 (S219).

Then, secure simple pairing is completed. Thus, the Bluetooth device 40 and the application 30 are connected (S210), and the Bluetooth device 40 and the application 30 will become a state of connection that allows Bluetooth communication.

Figure 13:
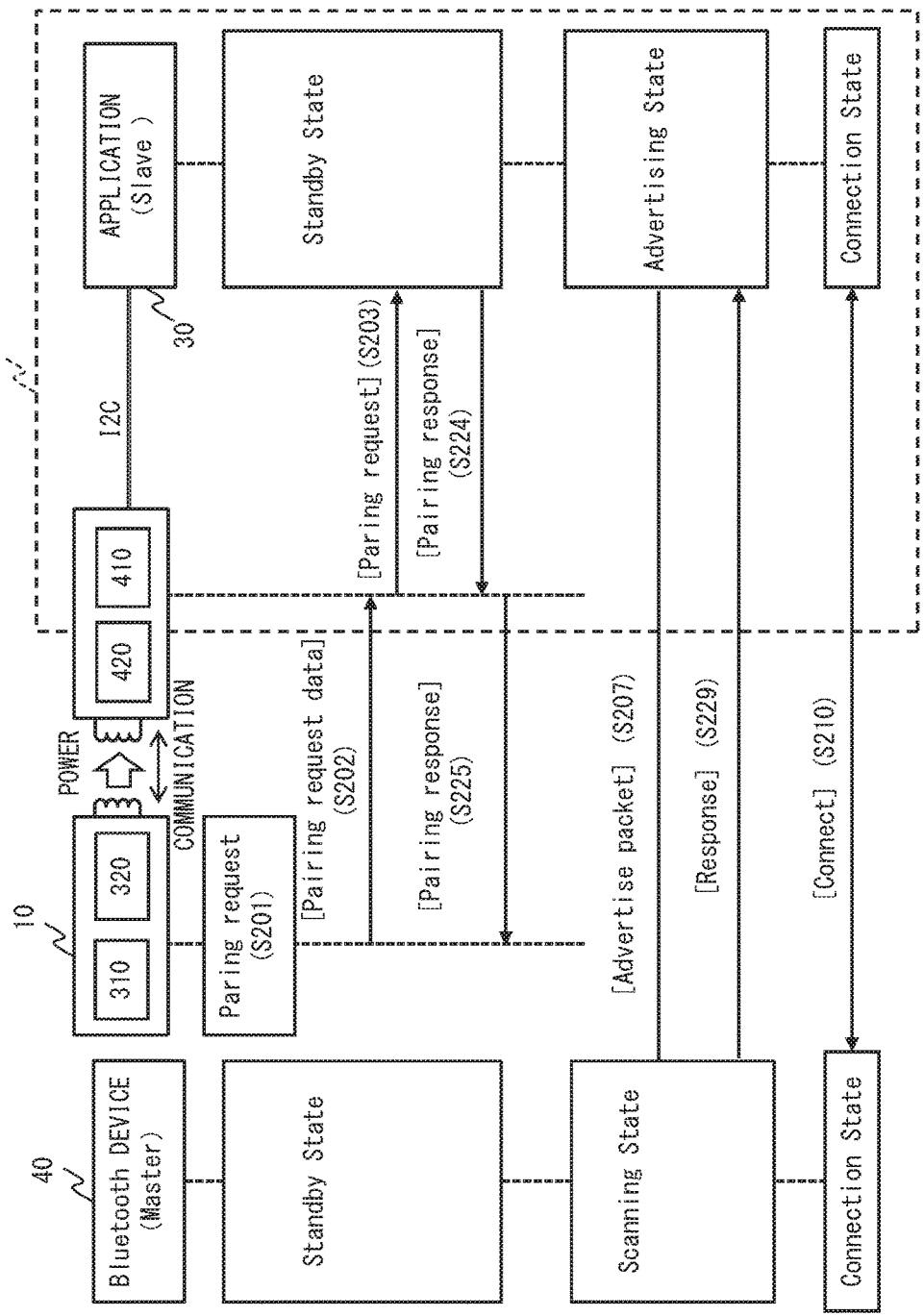
FIG. 13 is a sequence diagram showing a pairing operation example of the wireless power supply system according to the first embodiment.

FIG. 13 is an operation example when pairing is established by Smart Pairing. Smart Pairing is a pairing scheme employed by Bluetooth Smart (low energy). In Smart Pairing, there is no specially needed information, and only timings for state transitions are transmitted in the two-way communication of this embodiment.

In the example of FIG. 13, in a manner similar to the operations in FIG. 11, when a user requests the power transmitting apparatus 10 to establish pairing (S201), Pairing request data is transmitted from the power transmitting IC 320 to the power receiving apparatus 20 (S202), and the power receiving IC 420 and the RX controller 410 output a Pairing request to the application 30 (S203).

Next, when the application 30 accepts the Pairing request, the application 30 outputs a Pairing response to the RX controller 410 in order to establish smart pairing (S224). After this, when the RX controller 410 accepts the Pairing response, the Pairing response is transmitted from the power receiving IC 420 to the power transmitting apparatus 10 (S225).

On the other hand, the application 30 transitions from the Standby State to the Advertising State, and the Bluetooth communication unit 32 reports Advertise packets to the surroundings (S207). When the Bluetooth device 40 transitions from the standby state to the scanning state and receives the advertise packet transmitted by the application 30, the Bluetooth device 40 transmits a Response to the application 30 (S229).

Then, smart pairing is completed. Thus, the Bluetooth device 40 and the application 30 are connected (S210), and the Bluetooth device 40 and the application 30 will become a state of connection that allows Bluetooth communication.

As has been explained above, in this embodiment, the wireless power supply is employed to supply power to (to charge) the application apparatus, and communication necessary for the application is performed by two-way communication using a carrier of the wireless power supply. Thus, data corresponding to the application can be transmitted and received between the power transmitting side and the power receiving side. Further, it is possible to eliminate the need for a connector which is required for supplying power and the need for a physical switch in the power receiving side. As the physical switch corresponding to the application can be omitted, the waterproof property and corrosion resistance in addition to design and miniaturization of the power receiving application apparatus can be improved. In an application apparatus including a battery, while the application apparatus is being charged, an application can be operated whether or not the charging has completed. This is highly convenient because the charging is periodically needed.

As in, for example, this embodiment, when the application apparatus is a Bluetooth device, a switch for setting the pairing mode can be omitted. As mentioned above, when pairing is requested from the power transmitting side to the power receiving side, the Bluetooth function of the power receiving side is shifted to the pairing mode, thereby enabling a Bluetooth connection with an application in the power receiving side. The Bluetooth pairing is one example, and initial setting of another radio communication means such as a wireless LAN may be performed. For example, a security key for setting a wireless LAN communication unit in an application may be transmitted in the two-way communication of this embodiment so as to perform an authentication process. This eliminates the need for a switch in an application apparatus such as the wireless LAN communication unit.

Note that although information necessary for the pairing may be transmitted using NFC (Near Field Communication), as a dedicated NFC antenna will be necessary, it is difficult to miniaturize an apparatus as in this embodiment.

Second Embodiment

Hereinafter, a second embodiment shall be explained with reference to the drawings. Although in the first embodiment, an example in which information necessary for the Bluetooth function is transmitted between the power transmitting side and the power receiving side has been explained, an example of transmitting other information shall be explained in this embodiment.

Figure 14:
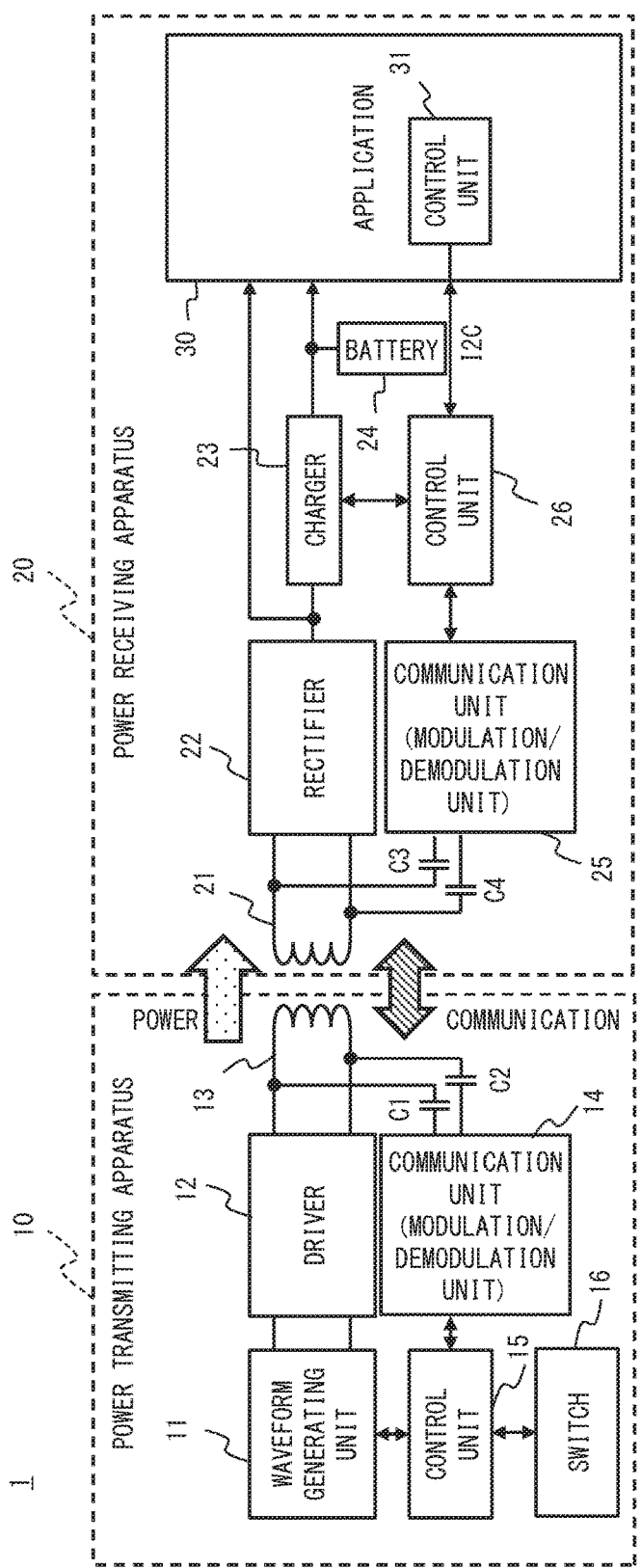
FIG. 14 is a block diagram showing a configuration example of a wireless power supply system according to a second embodiment.

In the example of FIG. 14, similar to the first embodiment, the power transmitting apparatus 10 includes the switch 16, and the application 30 of the power receiving apparatus 20 includes the control unit 31. By the configuration of FIG. 14, for example, an ON/OFF state of the switch 16 (switching data) is transmitted from the power transmitting apparatus 10 to the power receiving apparatus 20. In the power receiving apparatus 20, when the received ON/OFF state of the switch 16 is input to the control unit 31 of the application 30, the control unit 31 executes processes including powering the application ON/OFF (set the application 30 in a sleep state/wake the application 30 from the sleep state) according to ON/OFF of the switch 16, setting, and operations of functions on the application 30.

Differences between a configuration example of FIG. 15 and the configuration of the first embodiment are as follows. In the configuration example of FIG. 15, a personal computer 17 is connected to the power transmitting apparatus 10 via a USB or the like, and the application 30 of the power receiving apparatus 20 includes the control unit 31 a non-volatile memory 33. By the configuration shown in FIG. 15, for example, setting data, an application program and the like of the application 30 are transmitted from the power transmitting apparatus 10 to the power receiving apparatus 20. In the power receiving apparatus 20, the received setting data and application program are written in the non-volatile memory 33 via the control unit 31, and the setting is changed or updated.

Figure 15:
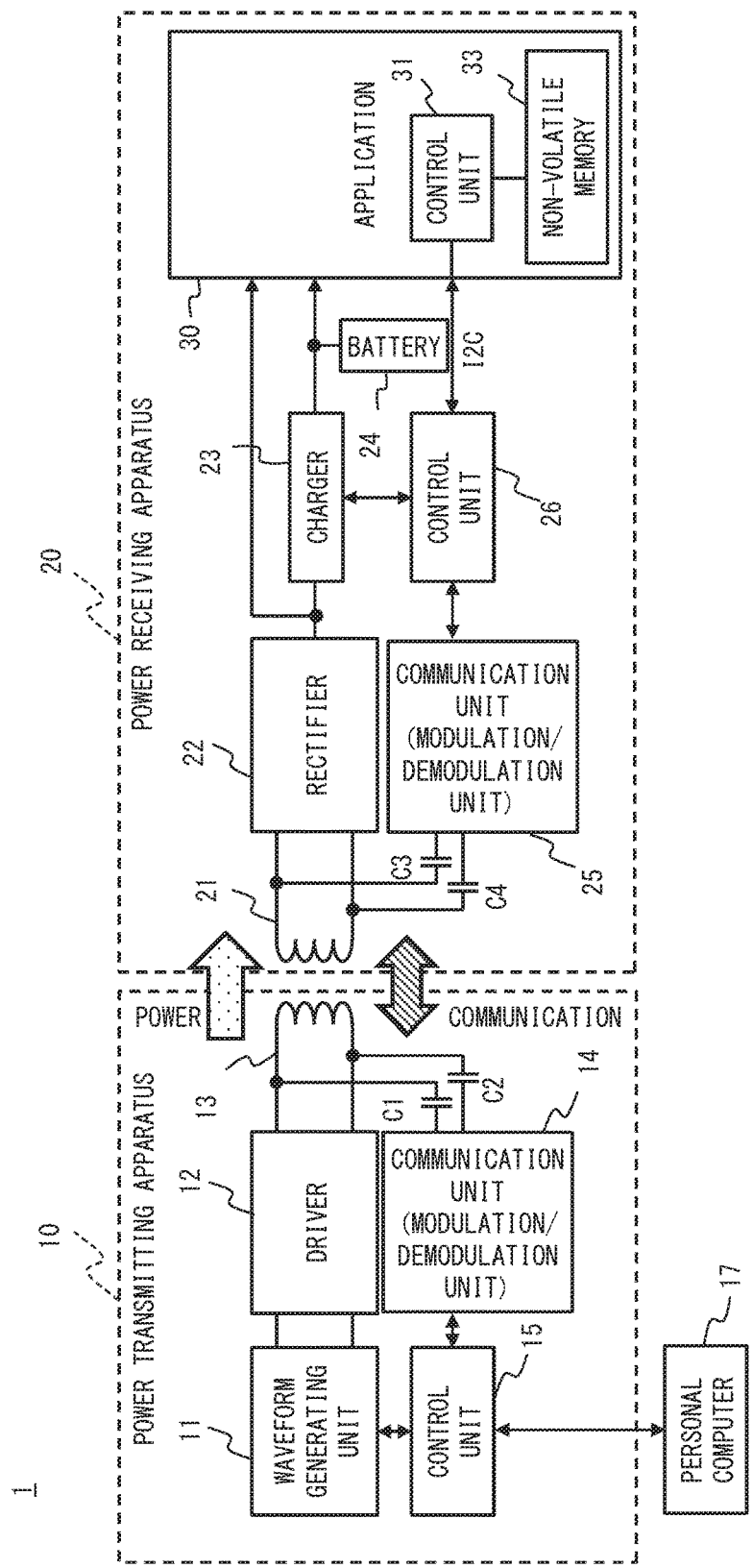
FIG. 15 is a block diagram showing a configuration example of the wireless power supply system according to the second embodiment.

Further, by the configuration shown in FIG. 15, a usage log, state data and the like regarding a result of executing the application 30 may be transmitted from the power receiving apparatus 20 to the power transmitting apparatus 10. The power transmitting apparatus 10 outputs the received usage log, the state data and the like to the personal computer 17 so that the personal computer 17 can utilize the information. The power transmitting apparatus 10 may be connected to the Internet or the like and utilize the information via the Internet.

Similar to the first embodiment, in this embodiment, as the physical switch of the application can be omitted, a waterproof property and corrosion resistance can be improved.

Although the invention made by the present inventor has been explained in detail according to the embodiments, it is obvious that the present invention is not limited to the above-explained embodiments and various modifications can be made without departing from the scope of the invention.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A wireless power supply system comprising:
a power transmitting apparatus; and
a power receiving apparatus, wherein
the power transmitting apparatus comprises:
a power transmitting coil that transmits AC power to the power receiving apparatus;
a first modulation/demodulation unit that performs a modulation/demodulation process on the AC power of the power transmitting coil; and
a first transreceiver unit that performs two-way communication with the power receiving apparatus via the first modulation/demodulation unit and transmits application data to the power receiving apparatus, and
the power receiving apparatus comprises:
a power receiving coil that receives the AC power from the power transmitting apparatus;
a second modulation/demodulation unit that performs a modulation/demodulation process on the AC power of the power receiving coil;
a second transreceiver unit that performs two-way communication with the power transmitting apparatus via the second modulation/demodulation unit and receives the application data from the power transmitting apparatus; and
an application processing unit that executes an application process based on the received application data, wherein
the power receiving apparatus is configured to perform an operation of achieving functions of an application, performed in communication from the power transmitting apparatus to the power receiving apparatus, in a case in which the power receiving apparatus comprises no physical switches and no connectors necessary for charging the power receiving apparatus.

2. The wireless power supply system according to claim 1, wherein
the first modulation/demodulation unit comprises:
a first modulation unit that amplitude modulates the AC power according to first transmission data, the first transmission data being transmitted to the power receiving apparatus; and
a first demodulation unit that demodulates first reception data according to the AC power that has been load modulated by the power receiving apparatus, the first reception data being received from the power receiving apparatus, and
the second modulation/demodulation unit comprises:
a second modulation unit that load modulates the AC power according to second transmission data, the second transmission data being transmitted to the power transmitting apparatus; and
a second demodulation unit that demodulates second reception data according to the AC power that has been amplitude modulated by the power transmitting apparatus, the second reception data being received from the power transmitting apparatus.

3. The wireless power supply system according to claim 2, wherein
the first modulation unit comprises:
a first transmission packet generating unit that generates a transmission packet of a predetermined format, the transmission packet including the first transmission data; and
a pulse train generating unit that generates a pulse train according to the generated transmission packet and outputs the generated pulse train to the power transmitting coil,
the first demodulation unit comprises:
a first conversion unit that converts an amplitude of the load modulated AC power into a digital signal; and
a first reception packet analyzing unit that analyzes a reception packet of the predetermined format based on the digital signal, the reception packet including the second reception data,
the second modulation unit comprises:
a second transmission packet generating unit that generates a transmission packet of the predetermined format, the transmission packet including the second transmission data; and
a switch that switches a load of the power receiving coil according to the generated transmission packet, and the second demodulation unit comprises:
a second conversion unit that converts an amplitude of the amplitude modulated AC power into a digital signal; and
a second reception packet analyzing unit that analyzes a reception packet of the predetermined format based on the digital signal, the reception packet including the second reception data.

4. The wireless power supply system according to claim 2, wherein
the power transmitting apparatus includes a first register that stores the first transmission data, the first reception data, a first transmission trigger flag, and a first reception notification flag,
the first transreceiver unit sets the first transmission trigger flag to ON after the first transmission data is stored in the first register,
when the first transmission trigger flag becomes ON, the first modulation unit starts transmitting the first transmission data that is stored in the first register, and after the transmission of the first transmission data is completed, the first modulation unit sets the first transmission trigger flag to OFF,
the first demodulation unit sets the first reception notification flag to ON after the first reception data is stored in the first register, and
when the first reception notification flag becomes ON, the first transreceiver unit starts obtaining the first reception data that is stored in the first register, and after the first transreceiver unit has completed obtaining the first reception data, the first transreceiver unit sets the first reception notification flag to OFF.

5. The wireless power supply system according to claim 2, wherein
the power receiving apparatus includes a second register that stores the second transmission data, the second reception data, a second transmission trigger flag, and a second reception notification flag,
the second transreceiver unit sets the second transmission trigger flag to ON after the second transmission data is stored in the second register,
when the second transmission trigger flag becomes ON, the second modulation unit starts transmitting the second transmission data that is stored in the second register, and after the transmission of the second transmission data is completed, the second modulation unit sets the second transmission trigger flag to OFF,
the second demodulation unit sets the second reception notification flag to ON after the second reception data is stored in the second register, and
when the second reception notification flag becomes ON, the second transreceiver unit starts obtaining the second reception data that is stored in the second register, and after the second transreceiver unit has completed obtaining the second reception data, the second transreceiver unit sets the second reception notification flag to OFF.

6. The wireless power supply system according to claim 1, wherein
the application data is initial setting data for performing initial setting on the application processing unit.

7. The wireless power supply system according to claim 6, wherein
the application processing unit is a Bluetooth (registered trademark) communication unit that performs Bluetooth communication, and
the application data is pairing setting data that sets the Bluetooth communication unit in a pairing mode for a pairing process of Bluetooth.

8. The wireless power supply system according to claim 7, wherein
the second transreceiver unit transmits pairing response data to the power transmitting apparatus after the second transreceiver unit receives the pairing setting data.

9. The wireless power supply system according to claim 8, wherein
the pairing response data includes a PIN code that is set in the Bluetooth communication unit, and
the first transreceiver unit outputs the PIN code included in the pairing response data that has been received from the power receiving apparatus.

10. The wireless power supply system according to claim 8, wherein
the pairing response data includes a numeric code that is set in the Bluetooth communication unit, and
the first transreceiver unit outputs the numeric code included in the pairing response data received from the power receiving apparatus.

11. The wireless power supply system according to claim 6, wherein
the application processing unit is a wireless LAN communication unit that performs wireless LAN communication, and
the application data is a security key to be set in the wireless LAN communication unit.

12. The wireless power supply system according to claim 1, wherein
the application data is switching data that powers ON/OFF the application processing unit.

13. The power supply system according to claim 1, wherein
the application data is an application program to be executed by the application processing unit.

14. The wireless power supply system according to claim 1, wherein
the second transreceiver unit transmits data regarding a result of executing the application process by the application processing unit to the power transmitting apparatus.

15. A power receiving apparatus comprising:
a power receiving coil that receives AC power from a power transmitting apparatus;
a modulation/demodulation unit that performs a modulation/demodulation process on the AC power of the power receiving coil; and
an application processing unit that executes an application process based on the received application data, wherein
the power receiving apparatus is configured to perform an operation of achieving functions of the application process, performed in communication from the power transmitting apparatus to the power receiving apparatus, in a case in which the power receiving apparatus comprises no physical switches and no connectors necessary for charging the power receiving apparatus.

* * * * *